US009251785B2

(12) United States Patent
Tremblay et al.

(10) Patent No.: US 9,251,785 B2
(45) Date of Patent: *Feb. 2, 2016

(54) CALL STEERING DATA TAGGING INTERFACE WITH AUTOMATIC SEMANTIC CLUSTERING

(71) Applicant: Nuance Communications, Inc., Burlington, MA (US)

(72) Inventors: Real Tremblay, Outremont (CA); Jerome Tremblay, Montreal (CA); Amy E. Ulug, San Jose, CA (US); Jean-Francois Fortier, Montreal (CA); Francois Berleur, Longueuil (CA); Jeffrey N. Marcus, Newton, MA (US); David Andrew Mauro, Montreal (CA)

(73) Assignee: Nuance Communications, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/554,494

(22) Filed: Nov. 26, 2014

(65) Prior Publication Data

US 2015/0081290 A1    Mar. 19, 2015

Related U.S. Application Data

(63) Continuation of application No. 13/246,801, filed on Sep. 27, 2011, now Pat. No. 8,903,712.

(51) Int. Cl.
*G06F 17/28* (2006.01)
*G06F 17/20* (2006.01)
(Continued)

(52) U.S. Cl.
CPC ........ *G10L 15/1815* (2013.01); *G06F 17/2785* (2013.01); *H04M 3/493* (2013.01);
(Continued)

(58) Field of Classification Search
CPC ............. G06F 17/289; G06F 17/2872; G06F 17/2785; G06F 17/2735; G06F 9/4448; G06F 17/3071; G06F 17/20616; G06F 17/30864; G06F 17/30707; G06F 17/30398; G06F 17/243; G06F 17/212; G06F 17/24; G06F 3/0481; G06F 3/0485; G06F 3/0483; H04M 11/062; G06Q 10/10; G11B 27/34; H04L 29/0809
USPC ............. 704/2–10; 379/93.01; 707/737–739, 707/769, 740, 705–708, 728, 807, 771, 707/694; 715/255, 840, 222, 738, 830, 853, 715/753, 777, 719, 256
See application file for complete search history.

(56) References Cited

U.S. PATENT DOCUMENTS 5,995,935 A * 11/1999 Hagiwara et al. ............. 704/272
6,321,188 B1 * 11/2001 Hayashi et al. ................ 704/4
(Continued)

*Primary Examiner* — Pierre-Louis Desir
*Assistant Examiner* — Anne Thomas-Homescu
(74) *Attorney, Agent, or Firm* — Lessani Law Group, PC

(57) ABSTRACT

A system and method for providing an easy-to-use interface for verifying semantic tags in a steering application in order to generate a natural language grammar. The method includes obtaining user responses to open-ended steering questions, automatically grouping the user responses into groups based on their semantic meaning, and automatically assigning preliminary semantic tags to each of the groups. The user interface enables the user to validate the content of the groups to ensure that all responses within a group have the same semantic meaning and to add or edit semantic tags associated with the groups. The system and method may be applied to interactive voice response (IVR) systems, as well as customer service systems that can communicate with a user via a text or written interface.

20 Claims, 5 Drawing Sheets

(51) Int. Cl.

| | | |
|---|---|---|
| *G06F 17/27* | (2006.01) | |
| *G06F 17/21* | (2006.01) | |
| *G06F 7/00* | (2006.01) | |
| *G06F 17/30* | (2006.01) | |
| *G06F 17/00* | (2006.01) | |
| *G06F 17/22* | (2006.01) | |
| *G06F 17/24* | (2006.01) | |
| *G06F 17/25* | (2006.01) | |
| *G06F 17/26* | (2006.01) | |
| *G10L 15/18* | (2013.01) | |
| *H04M 3/493* | (2006.01) | |
| *H04M 11/00* | (2006.01) | |
| *G06F 3/00* | (2006.01) | |
| *G06F 3/048* | (2013.01) | |
| *G10L 15/06* | (2013.01) | |

(52) U.S. Cl.
CPC ............... *G06F 3/00* (2013.01); *G06F 3/048* (2013.01); *G10L 15/1822* (2013.01); *G10L 2015/0638* (2013.01); *H04M 11/00* (2013.01)

(56) References Cited

U.S. PATENT DOCUMENTS

| | | | | |
|---|---|---|---|---|
| 6,380,937 B1* | 4/2002 | Dong et al. | | 345/440 |
| 6,493,703 B1* | 12/2002 | Knight et al. | | 1/1 |
| 6,778,982 B1* | 8/2004 | Knight et al. | | 707/737 |
| 6,796,486 B2* | 9/2004 | Ohashi | | 235/375 |
| 6,829,613 B1* | 12/2004 | Liddy | | 707/694 |
| 6,868,525 B1* | 3/2005 | Szabo | | 715/738 |
| 7,047,486 B1* | 5/2006 | Nagao | | 715/222 |
| 7,171,426 B2* | 1/2007 | Farmer et al. | | 422/2 |
| 7,231,343 B1* | 6/2007 | Treadgold et al. | | 704/9 |
| 7,360,151 B1* | 4/2008 | Froloff | | 715/255 |
| 7,362,892 B2* | 4/2008 | Lewis et al. | | 382/159 |
| 7,401,087 B2* | 7/2008 | Copperman et al. | | 707/737 |
| 7,548,847 B2* | 6/2009 | Acero et al. | | 704/9 |
| 7,693,705 B1* | 4/2010 | Jamieson | | 704/9 |
| 7,711,747 B2* | 5/2010 | Renders et al. | | 707/771 |
| 8,321,477 B2* | 11/2012 | Schmidtler et al. | | 707/807 |
| 8,370,362 B2* | 2/2013 | Szabo | | 707/739 |
| 8,380,696 B1* | 2/2013 | Rogers et al. | | 707/708 |
| 8,515,736 B1* | 8/2013 | Duta | | 704/9 |
| 8,589,373 B2* | 11/2013 | Mayer | | 707/706 |
| 2002/0035466 A1* | 3/2002 | Kodama | | 704/4 |
| 2003/0233224 A1* | 12/2003 | Marchisio et al. | | 704/4 |
| 2004/0078189 A1* | 4/2004 | Wen et al. | | 704/3 |
| 2004/0078380 A1* | 4/2004 | Wen et al. | | 707/101 |
| 2004/0107088 A1* | 6/2004 | Budzinski | | 704/10 |
| 2004/0117737 A1* | 6/2004 | Bera | | 715/530 |
| 2005/0114794 A1* | 5/2005 | Grimes et al. | | 715/840 |
| 2005/0182765 A1* | 8/2005 | Liddy | | 707/5 |
| 2006/0155662 A1* | 7/2006 | Murakami et al. | | 706/20 |
| 2006/0248054 A1* | 11/2006 | Kirshenbaum et al. | | 707/3 |
| 2008/0010280 A1* | 1/2008 | Jan et al. | | 707/7 |
| 2008/0249999 A1* | 10/2008 | Renders et al. | | 707/4 |
| 2009/0063959 A1* | 3/2009 | Stejic | | 715/255 |
| 2009/0208116 A1* | 8/2009 | Gokturk et al. | | 382/209 |
| 2009/0271179 A1* | 10/2009 | Marchisio et al. | | 704/9 |
| 2009/0276380 A1* | 11/2009 | Acero et al. | | 706/12 |
| 2010/0063799 A1* | 3/2010 | Jamieson | | 704/9 |
| 2010/0122214 A1* | 5/2010 | Sengoku | | 715/830 |
| 2010/0205180 A1* | 8/2010 | Cooper et al. | | 707/740 |
| 2010/0312782 A1* | 12/2010 | Li et al. | | 707/769 |
| 2011/0060712 A1* | 3/2011 | Harashima et al. | | 706/47 |
| 2011/0144978 A1* | 6/2011 | Tinkler | | 704/10 |
| 2011/0200181 A1* | 8/2011 | Issa et al. | | 379/93.01 |
| 2011/0218983 A1* | 9/2011 | Chaney et al. | | 707/705 |
| 2011/0238409 A1* | 9/2011 | Larcheveque et al. | | 704/9 |
| 2011/0238410 A1* | 9/2011 | Larcheveque et al. | | 704/9 |
| 2011/0276396 A1* | 11/2011 | Rathod | | 705/14.49 |
| 2011/0295603 A1* | 12/2011 | Meisel | | 704/246 |
| 2012/0022856 A1* | 1/2012 | Prompt et al. | | 704/9 |
| 2012/0023102 A1* | 1/2012 | Venkataraman et al. | | 707/737 |
| 2012/0079372 A1* | 3/2012 | Kandekar et al. | | 715/256 |
| 2012/0079385 A1* | 3/2012 | Ellis et al. | | 715/719 |
| 2012/0084283 A1* | 4/2012 | Chitiveli et al. | | 707/728 |
| 2012/0096389 A1* | 4/2012 | Flam et al. | | 715/777 |
| 2012/0102037 A1* | 4/2012 | Ozonat | | 707/738 |
| 2012/0110008 A1* | 5/2012 | Pieper | | 707/769 |
| 2012/0117516 A1* | 5/2012 | Guinness | | 715/853 |
| 2012/0179980 A1* | 7/2012 | Whalin et al. | | 715/753 |
| 2012/0221564 A1* | 8/2012 | Jones et al. | | 707/728 |
| 2012/0254230 A1* | 10/2012 | Aman et al. | | 707/769 |
| 2012/0265744 A1* | 10/2012 | Berkowitz et al. | | 707/705 |
| 2012/0303605 A1* | 11/2012 | Lunenfeld | | 707/707 |
| 2013/0139111 A1* | 5/2013 | Grimes et al. | | 715/840 |
| 2013/0268261 A1* | 10/2013 | Kim et al. | | 704/9 |
| 2013/0275121 A1* | 10/2013 | Tunstall-Pedoe | | 704/9 |
| 2014/0019432 A1* | 1/2014 | Lunenfeld | | 707/706 |
| 2014/0156664 A1* | 6/2014 | Gallivan | | 707/737 |

* cited by examiner

FIG. 3

CALL STEERING DATA TAGGING INTERFACE WITH AUTOMATIC SEMANTIC CLUSTERING

RELATED APPLICATIONS

This application is a continuation of co-pending U.S. patent application Ser. No. 13/246,801 titled "Call Steering Data Tagging Interface with Automatic Semantic Clustering," and filed on Sep. 27, 2011, the contents of which are incorporated herein by reference as if fully disclosed herein.

BACKGROUND OF THE INVENTION

1. Field of the Invention

This invention relates generally to software design tools and, more particularly, to a user interface that aids a developer of an interactive voice response (IVR) system in creating a call steering application to associate user intent with the user's responses to open-ended questions.

2. Description of the Background Art

In many interactive voice response (IVR) systems, a user inputs one of a pre-defined set of a responses in order to be routed to a destination (e.g., "for customer service, press or say 1;" for technical support, press or say 2;" etc.). A call steering application within an IVR system is different in that it routes a caller to his or her intended destination based on receiving responses to open-ended questions (e.g., "What is the purpose of your call?"). Call steering applications are difficult to implement because there are many possible responses to an open-ended question. Even among users that have the same objective or intent, there can be many different responses to a question. For example, an IVR system for a banking institution may ask its customers what they would like assistance with. A customer could respond with "New account," "Checking account," or "Open account" with the intention of being transferred to the same destination. A developer of a call steering application must associate each of the various likely responses with a semantic meaning. Given the large number of possible responses, this is usually a complex and time-consuming process requiring the expertise of specialist and various scripts.

Therefore, there is a need for a call steering application development tool that enables businesses to more easily and efficiently develop and create a call steering application. Specifically, there is a need for a user interface that enables a user to easily tag response data with a semantic meaning so that statistical models can be trained to better understand the responses to the open ended questions.

SUMMARY OF THE INVENTION

The present invention is directed to a system and method for providing a developer of an interactive response system with an easy-to-use interface for training the natural language grammar of a steering application to appropriately steer the user's session in response to an open-ended question. More specifically, the system and method enables the developer of the steering application to associate semantic tags with user responses, which may be in the form of either voice or written inputs.

User responses to an open-ended steering question posed by an interactive response system are obtained. The user responses are then automatically clustered into groups, where each group is a set of sentences that are semantically related. Preliminary semantic tags are then automatically assigned to each of the groups. A user interface is provided that enables a user to validate the content of the groups to ensure that all sentences within a group have the same semantic meaning and to view and edit the preliminary semantic tags associated with the groups.

The user interface includes a groups view that displays a list of the groups and corresponding semantic tags for each group. The groups view enables a user to edit the preliminary semantic tags associated with each of the groups. The user interface also includes a sentence view that displays, for a selected group in the groups view, a list of unique sentences associated with the selected group. In the sentence view, a user is able to verify whether or not a sentence belongs to the group selected in the groups view. Finally, the user interface includes a related-groups view that displays, for a selected group in the groups view or a selected sentence in the sentence view, a plurality of groups most closely related to the selected group or sentence.

The user interface enables a user to move a displayed sentence in one group to a different group, such as, for example, by dragging the sentence from the sentence view to one of the plurality of most closely related groups in the related-groups view or to one of the plurality of groups in the groups view. In one embodiment, the user is also able to move a displayed sentence to a group-later holding area or to a rejected-sentence holding area.

Other functionality includes the ability to merge groups, create a new group, apply an inconsistency checker to detect inconsistencies in the tagged data, and apply semantic clustering to new or unverified sentences, where applying semantic clustering distributes the new or unverified sentences into groups based at least in part on the grouping of the previously verified sentences.

In a preferred embodiment, user responses are clustered and tagged in phases. In this embodiment, a subset of the obtained user responses is selected, and this subset is clustered into groups, where each group is a set of sentences that are semantically related. Preliminary semantic tags are automatically assigned to each of the groups, and the groups are then displayed in the above-described user interface to enable a user to verify and edit the content of the groups and the semantic tags associated with the groups. This process is repeated one or more times with another subset of user responses until all the user responses have been grouped and tagged. In one embodiment, the "most valuable" user responses are selected for grouping and tagging first. The "most valuable" may be the most common responses or those responses with certain key words or phrases.

Each iteration of clustering and tagging may use data from previously grouped and tagged responses to increase the accuracy of the clustering and preliminary tagging steps. In other words, the system may be able to better automatically group and tag responses with each iteration.

Examples of interactive response systems include interactive voice response (IVR) systems, as well as customer service systems that can communicate with a user via a text or written interface.

BRIEF DESCRIPTION OF THE DRAWINGS

FIG. 3 illustrates another view of the implementation of FIG. 2.

DETAILED DESCRIPTION OF THE PREFERRED EMBODIMENTS

Figure 1:
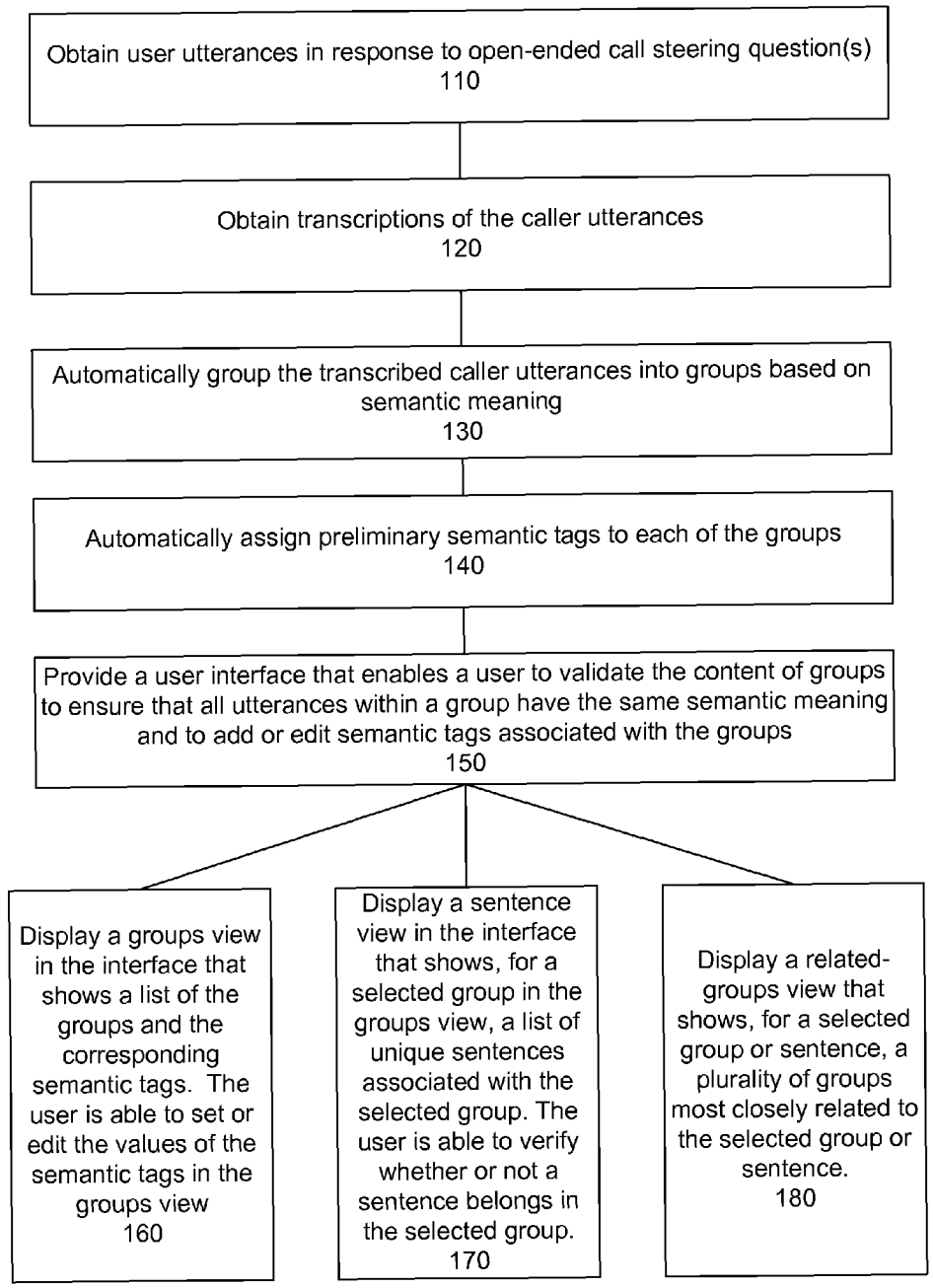
FIG. 1 illustrates a flowchart of a method according to one embodiment of the present invention.

FIG. 1 illustrates a method for a developer of a call steering application to associate semantic tags with user responses. In the illustrated method, the user responses are caller utterances to an IVR system, but, as discussed below, the invention is not limited to associating semantic tags with voice utterances. An IVR system obtains user utterances in response to open-ended questions (step 110). For example, an IVR system of a banking institution may ask customers what they would like assistance with. The responses may include "Open a checking account," "New account," "Get another account," or many others.

Once user utterances have been obtained, the IVR system then obtains transcriptions of the caller utterances (step 120). This may be performed manually by individuals listening to and transcribing each recorded utterance, automatically through use of an audio transcription system, or partially manually and partially automatically. In a preferred embodiment, the number of manual transcriptions are minimized in accordance with the audio clustering method described in the patent application titled "Sample Clustering to Reduce Manual Transcriptions in Speech Recognition System" filed as U.S. patent application Ser. No. 12/974,638 on Dec. 21, 2010 and herein incorporated by reference in its entirety.

After obtaining transcriptions of caller utterances, the transcribed caller utterances are then automatically grouped into groups or "clusters" based on their semantic meaning (step 130). In the above example, "Open a checking account," "New account," "Get another account," would all be grouped together as they have the same semantic meaning. Further details of this process are disclosed in the patent application titled "Training Call Routing Applications by Reusing Semantically-Labeled Data Collected for Prior Applications" filed as U.S. patent application Ser. No. 12/894,752 on Sep. 30, 2010 and herein incorporated by reference in its entirety.

Preliminary semantic tags are then automatically assigned to each of the groups (step 140). In a preferred embodiment, a semantic tag could comprise an "action" tag and an "object" tag. In the above example, the group including the user utterances "Open a checking account," "New account," and "Get another account" may be assigned the action "Open" and the object "Account." As a person skilled in the art would understand, other types of tags may be assigned within the scope of this invention. In certain embodiments, the IVR system and/or the call steering application may assign preliminary tags by connecting to a database of semantically-labeled data gathered from prior applications, which correlates user utterances and assigned tags. In some cases, this database would be updated regularly, such as for example, by receiving feedback from other call steering applications that connect with it. The IVR system and/or the call steering application may also assign tags based on any available data determined through previous iterations of the application being developed (e.g., based on information learned from previously-tagged data for the application).

A user interface is then provided to the developer to enable the developer to validate the content of groups to ensure that all sentences within a group have the same semantic meaning and to add or edit semantic tags associated with the groups 150. In a preferred embodiment, the user interface displays three sections: a groups view, a sentence view, and a related-groups view.

The groups view shows a list of the groups and the corresponding semantic tags. The developer is able to set or edit the values of the semantic tags in the groups view (step 160). By clustering sentences into groups, the interface reduces the amount of data the developer is required to process, as the developer tags the whole group rather than tagging sentences individually. As will be discussed in further detail later, the user interface enables a developer to fine-tune group membership in order to create a semantically consistent set of sentences. This fine-tuning includes, for example, the developer being able to create new groups, merge groups, or remove groups.

The sentence view shows, for a selected group in the groups view, a list of unique sentences associated with the selected group. The user is able to verify whether or not a sentence belongs in the selected group (step 170). The user is also able to move sentences, such as to another group, to a group-later holding area or to a rejected-sentence holding area. In one embodiment, the developer can move a sentence by dragging the sentence to one of the related groups in the related-groups view.

The related-groups view shows, for a selected group or sentence, a plurality of groups most closely related to the selected group or sentence (step 180). This helps to guide the developer to select an appropriate group for a sentence by ordering and displaying the most likely options.

In one embodiment, after a developer has validated group content and reviewed and edited (as necessary) the semantic tags for each group, the Call Steering Tagging User Interface Module 550 (see FIG. 5) automatically checks for similar sentences that have been tagged with non-similar semantic tags. This provides an error-checking functionality to increase the accuracy of the verification process by detecting inconsistencies in the tagged data. In another embodiment, the user may press a button on the user interface to invoke the inconsistency checker.

Figure 2:
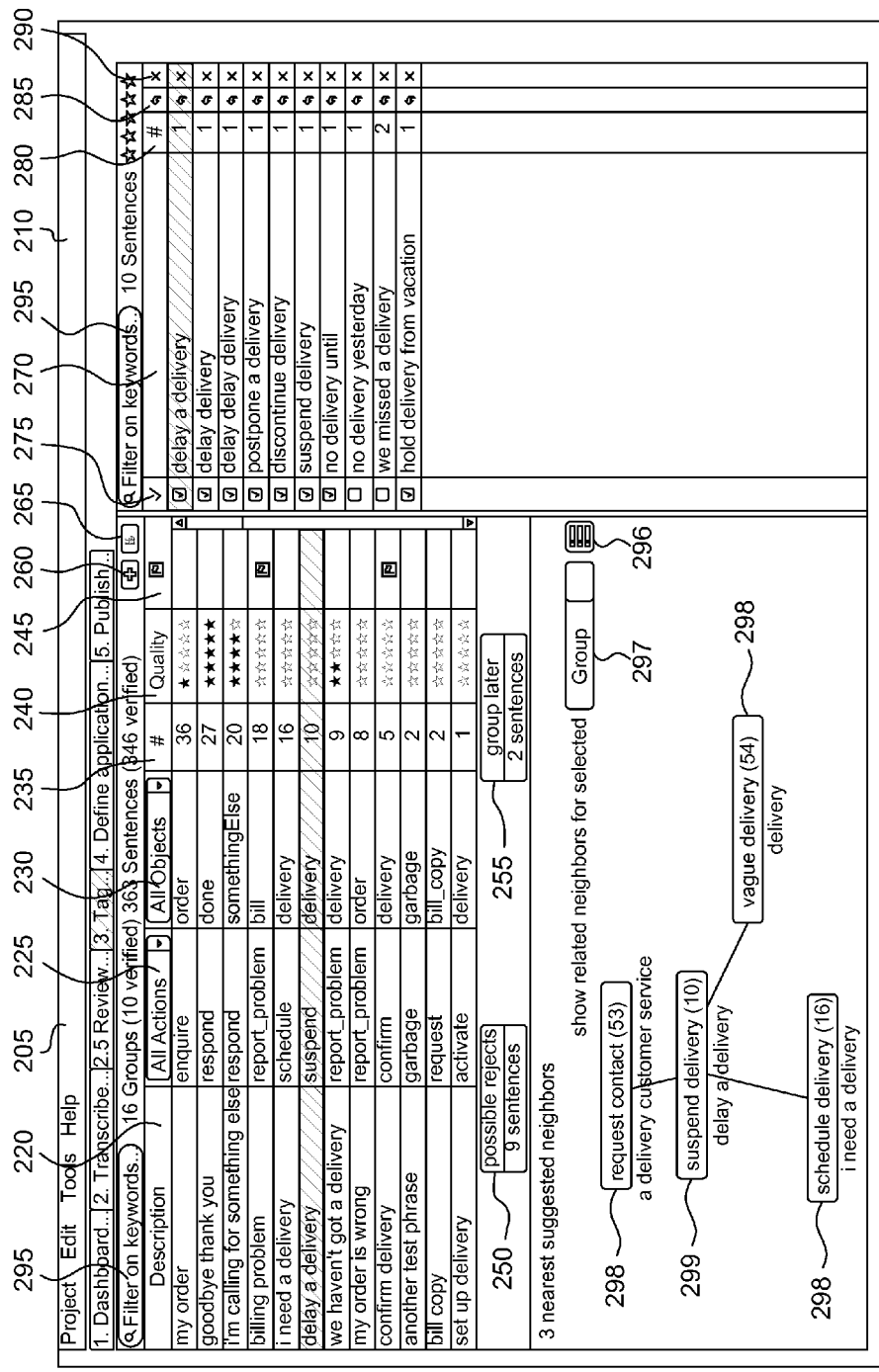
FIG. 2 illustrates an exemplary implementation of the user interface.
Figure 3:
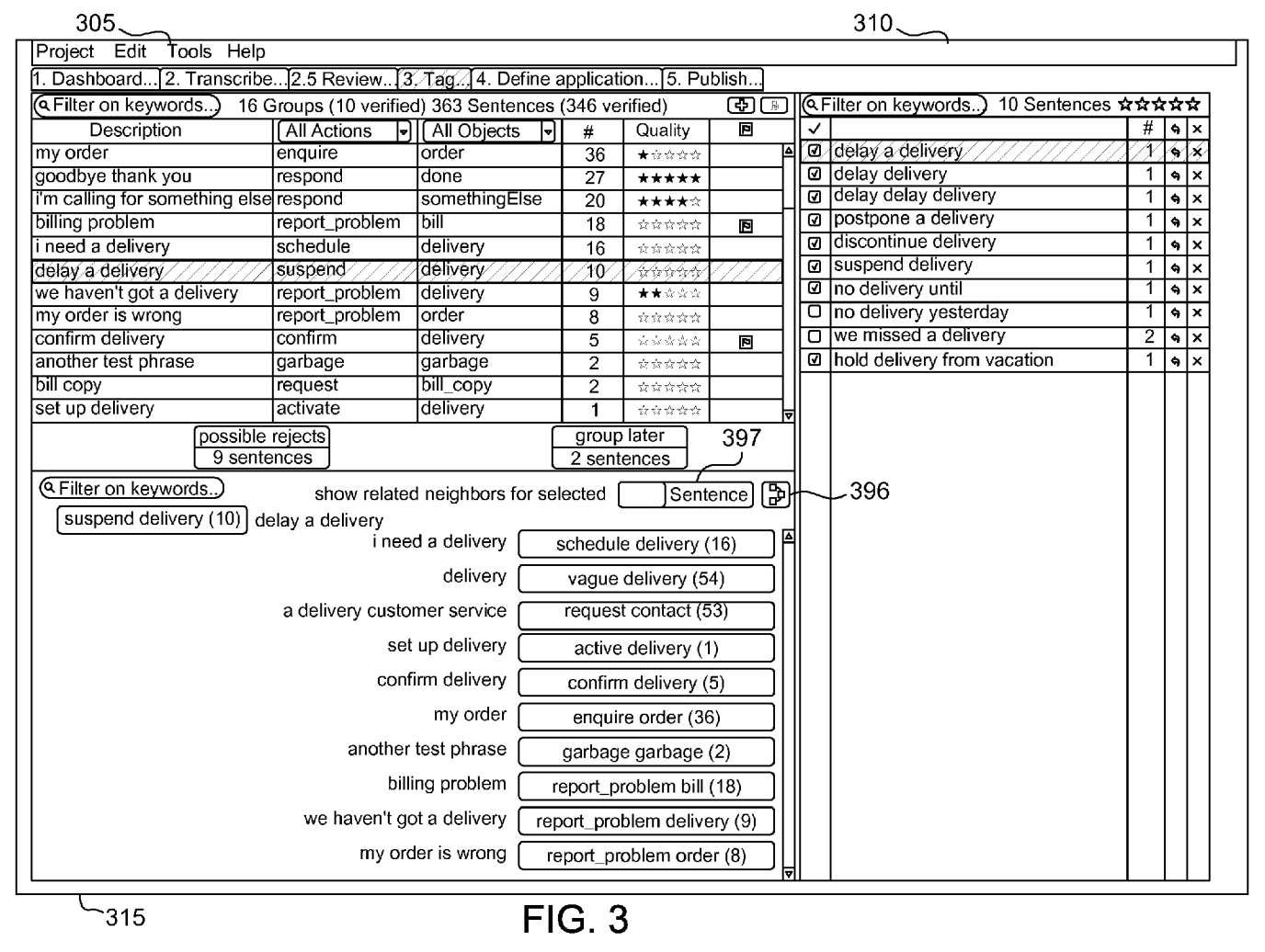

FIGS. 2 and 3 depict an implementation of the user interface according to one example embodiment. As a person skilled in the art would understand, the user interface can be designed in any number of ways and still be within the scope of the present invention. Similar to the discussion above, the illustrated user interface of FIG. 2 has three sections: the groups view 205, the sentence view 210, and the related-groups view 215.

The groups view 205 displays a description that is pre-filled with a sample sentence 220 for each group formed in step 130 of FIG. 1 (or subsequently created by the user via the interface). The pre-filled description may be tailored by the user during the application development process. Each row in column 220 corresponds to a different group. As discussed above, each group is tagged with an action, shown in the column 225 "All Actions," and an object, shown in the column 230 "All Objects." The developer of the call steering application is able to edit each of these tags to best fit the group. The next column 235 illustrates the number of unique sentences in each group. The following column 240 shows a quality rating that is assigned by the developer. For example, the developer may want to make a note of his or her confidence in the verified group, where a high confidence may be marked as five stars and a lower confidence may be marked as two or three stars. The developer may then return to the groups where he or she has marked a lower confidence score. The last column 245 allows a developer to mark a flag based on a self-determined criteria. For example, the developer may want to flag groups to revisit, groups that are questionable, or groups that have successfully completed peer review.

Additionally, in certain embodiments, the groups view may contain a button that connects the developer to a rejected-sentences holding area 250 and another button that connects the developer to a group-later holding area 255. These two features will be discussed in further detail in the sentence view section below. There may additionally be an add group button 260, which would create a new group for the developer to populate with sentences.

The groups view may also include an initiate semantic clustering button 265. For example, as new sentences are introduced into the system, the initiate semantic clustering button 265 may change color to notify the developer that more data has been introduced. When the developer presses the initiate semantic clustering button 265, any new sentences added to the system will be distributed into groups based on the group membership of previously verified sentences and any unverified sentences may be redistributed into other groups based on the group membership of previously verified sentences without breaking or merging already verified groups. In other words, as group membership is fine-tuned by a user, the system can learn from the information and use it to distribute/redistribute any new or unverified sentences. This allows for the system to refresh based on the most up-to-date information.

The sentence view displays a list of sentences 270 corresponding to the selected group in the groups view 205. For example, in FIG. 2, the selected group in the groups view 205 is "delay a delivery" and the ten sentences shown in the sentence view 210 are unique transcriptions related to delaying a delivery. In certain embodiments, the list of sentences may be characterized, for example color-coded, to indicate the orthographic distance of each sentence from the representative sample. For example, if a sentence on the list is orthographically close to the representative sample, the sentence may be listed in black, but if a sentence on the list is orthographically far from the representative sample, the sentence may be listed in red to indicate that it may not belong to that group. The column to the left of the listed sentences 270 allows the developer to check the box 275 when the sentence has been verified as correctly belonging to the selected group. The column to the right of the listed sentences 270 indicates the number of times 280 the particular sentence occurs in the utterance data.

When a developer clicks the arrow 285 in the next column, the corresponding sentence is moved to the group-later holding area, accessible through pressing the group-later button 255. In certain embodiments, when the number of sentences in the group-later holding area reaches a certain threshold, the application will remind the developer to review those sentences and to move them into other groups.

When a developer clicks the cross 290 in the far right column, the corresponding sentence is moved to the possible-rejects holding area, accessible through pressing the possible-rejects button 250. The developer may also move a sentence into another group by dragging it to the group. For example, the developer may drag the sentence to one of the groups in the groups view or to one of the closely related groups as shown in the related-groups section. The developer may also create a new group for a particular sentence by right clicking on a selected sentence and choosing to add a new group through a pop-up menu.

With both the groups view and the sentence view, the developer is given the option to filter 295 the groups or sentences for certain keywords. By limiting the number of groups or sentences in the groups or sentence view, the developer may more efficiently organize sentences into appropriate groups. The developer may also filter the groups based on a column header, such as for example the "All Actions" 225 or "All Objects" 230 column in the groups view. The developer can also sort the remaining columns to further optimize organization.

In the illustrated embodiment, the related groups view 215 may be displayed in either a star diagram (FIG. 2) or in a list format (FIG. 3). In the star diagram view, the selected group or sentence is in the middle of the diagram, with a plurality of most closely related groups surrounding the selected group or sentence. In the list view, the most closely related groups are displayed in a list in order of semantic distance from the selected group or sentence. The developer may change the display from the star diagram to the list format by toggling a button 296 on the related-groups view. Additionally, the developer may toggle a button 297 to display the related groups (based on semantic distance) of a selected sentence rather than the selected group (as currently displayed). As shown in the related-groups view of FIG. 2, there are three suggested neighbors 298 (having close semantic distance) with the selected group 299, "suspend delivery." Also shown in parentheses are the number of sentences corresponding to each of the groups.

FIG. 3 is similar to FIG. 2, but for the related-groups view 315. The related-groups view 315 is illustrated in the list format with the most closely related group (based on semantic distance) at the top of the list and the least closely related group towards the bottom of the list. In this case, the related-groups view 315 shows the most closely related groups to the selected sentence in the sentence view 310, rather than the selected group in the groups view 305, as shown in FIG. 2. Similar to the discussion in the previous paragraph, to change the display from the list format to the star diagram, the developer would press button 396 and to change the display from the related groups of the selected sentence to the related groups of the selected group, the developer would toggle button 397.

Figure 4:
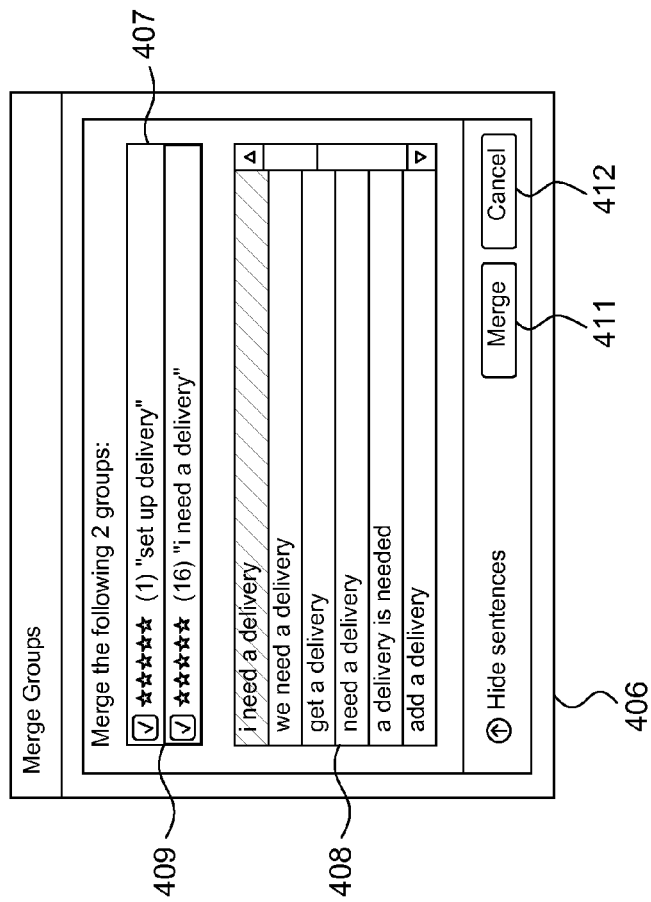
FIG. 4 illustrates an exemplary implementation of the merge function of the present invention.

In one embodiment, the user interface enables a user to merge groups. FIG. 4 illustrates an example implementation of the merge function of the present invention. The developer may select more than one group from the groups view 305 and elect the merge tool by right clicking and choosing from a menu. The developer may also elect the merge tool from the tool drop down menu at the top of the user interface. A screen 406 will pop up showing the plurality of selected groups 407, as well as the sentences corresponding to the selected groups 408. The developer may edit the groups included in the merge request by clicking or unclicking the boxes 409 corresponding to each group. After the developer verifies that he or she would like to proceed with the merge function, the developer may press the merge button 411 to confirm. The developer will then see all of the sentences within a single larger group. If the developer decides not to proceed with the merge function, the developer can press the cancel button 412. This merge function may be applied to two groups, three groups, or any number of groups, but will only successfully merge groups that share the same semantic tags.

Figure 5:
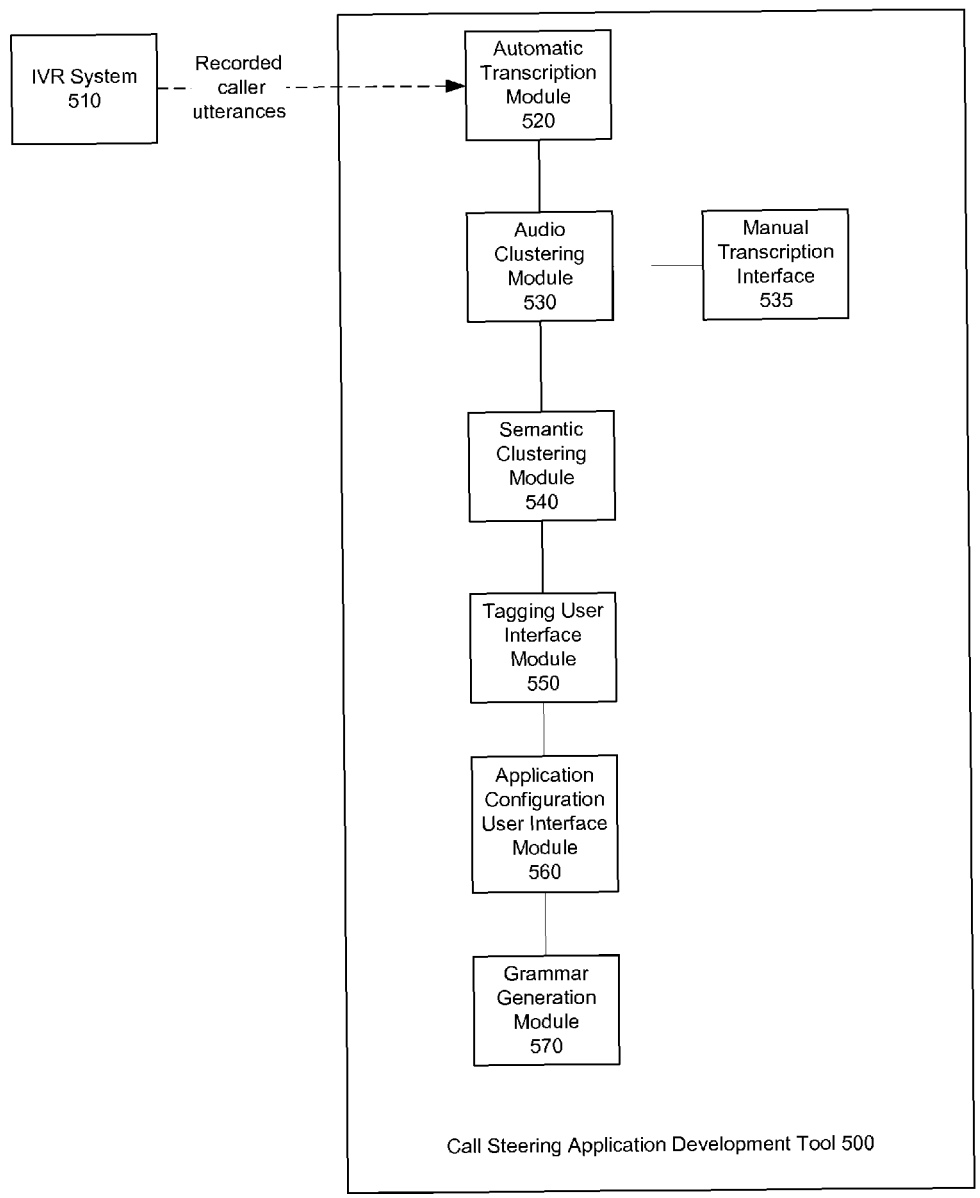
FIG. 5 illustrates one embodiment of the software architecture for a Call Steering Application Development Tool.

FIG. 5 illustrates a representative software architecture for a Call Steering Application Development Tool 500, which performs the method of FIG. 1. FIG. 5 is only an example, and a person of skill in the art would understand that other software architecture may be designed within the scope of the invention. Another design may have more or less or different modules than those depicted.

An Automatic Transcription Module 520 transcribes utterances recorded by IVR System 510. An Audio Clustering Module 530 performs audio clustering to reduce the amount of manual verification needed for the transcriptions. Specifically, utterances that sound identical are grouped together by the Audio Clustering Module 530. Consequently, a user is able to verify the transcription of a representative sentence in each cluster, as opposed to having to verify the transcription of every utterance. In a preferred embodiment, the Audio Clustering Module 530 operates in accordance with the audio clustering method described in the U.S. patent application Ser. No. 12/974,638, which was previously incorporated by reference herein. A Manual Transcription Interface 535 enables a user to verify and correct automatic transcriptions as needed.

The Semantic Clustering Module 540 clusters the transcribed utterances into groups by semantic meaning. In the preferred embodiment, the Semantic Clustering Module 540 operates in accordance with the semantic clustering method described in U.S. patent application Ser. No. 12/894,752, which was previously incorporated by reference herein.

The Tagging User Interface Module 550 generates a user interface as discussed with respect to FIGS. 1-4. The Application Configuration User Interface Module 560 enables a user to further configure the call steering application by associating one or more semantic tags to particular caller intents (i.e., destinations in the IVR system). The Grammar Generation Module 570 generates a natural language grammar from the way in which semantic tags are mapped to the caller's intended destination.

In certain embodiments, the Tagging User Interface Module 550 is configured to operate in "phases" in order to ensure that the automatic groupings and assignments of semantic tags are of higher quality and to increase overall efficiency in developing the application. In "Phased Tagging," a subset of the user responses is initially chosen. The user responses in the subset are then automatically grouped within the subset into groups of semantically related sentences. Preliminary semantic tags are automatically assigned to each group, and each group is displayed in the above-described user interface to enable a user to verify and edit the content of the groups and the semantic tags associated with the group.

The subset can be a random set of user responses or chosen based on particular criteria, such as, for example, user responses containing the most common sentences, user responses containing key words or phrases, or based on any other criteria. Because the subset contains fewer overall sentences, each group also contains fewer sentences and the developer will be able to verify the sentences in the groups and validate the semantic tags more efficiently. In certain embodiments, each subset is presented to the developer in individual sentences rather than being grouped into sets of sentences that are semantically related.

Once the initial subset has been verified, another subset of user responses is chosen. Responses in the next subset are clustered into groups of semantically related sentences and preliminary semantic tags are automatically assigned to each group, but for this subset and all future subsets, data from the previously validated and tagged groups are incorporated into the semantic clustering and tagging to increase accuracy. This process of selecting subsets, grouping within the subset, assigning preliminary semantic tags, and providing a user interface is repeated iteratively until all user responses have been processed. In certain embodiments, the next phase of the iterative process is initiated automatically. In other embodiments, the next phase of the iterative process is initiated when the developer presses a button to initiate semantic clustering for the next subset of responses.

While the foregoing discussion has been framed in terms of an interactive voice response (IVR) system, the inventive concept can be applied to any interactive response system within the scope of the present application. For example, certain embodiments of the present invention may include systems and methods for developing a steering application to direct written or textual inputs (rather than audio inputs), such as, for example, text messaging, emails, online chat system communications, internet or web based communications, or other forms of customer service systems. Such interactive response systems based on written or textual data may not require certain steps described above that are more specific to an interactive voice response system, such as, for example, transcription of the user utterances, but would be similar in all other respects.

As will be understood by those familiar with the art, the invention may be embodied in other specific forms without departing from the spirit or essential characteristics thereof. Accordingly, the above disclosure of the present invention is intended to be illustrative and not limiting of the invention.

The invention claimed is:

1. A method for enabling a developer of a steering application to associate semantic tags with user responses, the method comprising:

obtaining user responses to an open-ended steering question posed by an interactive response system;

automatically grouping the user responses into groups, wherein each group is a set of sentences that are semantically related;

automatically assigning preliminary semantic tags to each of the groups; and providing a user interface that enables a user to validate the content of the groups to ensure that all sentences within a group have the same semantic meaning and to view and edit the preliminary semantic tags associated with the groups, wherein the interface includes:

a groups view that displays a list of the groups and corresponding semantic tags for each group, wherein the groups view enables a user to edit the preliminary semantic tags associated with each of the groups, a sentence view that displays, for a selected group in the groups view, a list of unique sentences associated with the selected group, wherein in the sentence view a user is able to verify whether or not a sentence belongs to the group selected in the groups view, and a related-groups view that displays, for a selected group in the groups view or a selected sentence in the sentence view, a plurality of groups most closely-related to the selected group or sentence.

2. The method of claim 1, wherein the user responses are spoken utterances.

3. The method of claim 2, wherein, prior to grouping the user responses into groups, transcriptions are obtained for the spoken utterances.

4. The method of claim 1, wherein the user responses are in the form of written or textual inputs.

5. The method of claim 4, wherein the written or textual inputs include one or more of text messaging, emails, online chat system communications, and Internet or web-based communications.

6. The method of claim 1, wherein the semantic tags comprise a value for an action and a value for an object.

7. The method of claim 1, wherein, from the sentence view, a user is able to move a displayed sentence to a different group.

8. The method of claim 1, wherein, in the related groups view, groups are displayed in a star diagram with the selected group or sentence in the middle of the star diagram and the plurality of most closely-related groups surrounding the selected group or sentence.

9. The method of claim 1, wherein, in the related groups view, the plurality of most closely-related groups are displayed in a list in order of semantic distance from the selected group or sentence.

10. The method of claim 1, wherein a sentence in the sentence view can be moved to a different group by dragging the sentence to one of the plurality of most closely-related groups in the related-groups view.

11. The method of claim 1, wherein a sentence in the sentence view can be moved to a different group by dragging the sentence to one of the plurality of groups in the groups view.

12. The method of claim 1, wherein the user interface enables the user to merge groups.

13. The method of claim 1, wherein the user interface enables the user to create a new group.

14. A non-transitory, computer-readable medium comprising a computer program that, when executed by a computer system, enables the computer system to perform a method for enabling a developer of a steering application to associate semantic tags with user responses, the method comprising:
   obtaining user responses to an open-ended steering question posed by an interactive response system;
   selecting a subset of user responses;
   automatically grouping the user responses within the subset into groups, wherein each group is a set of sentences that are semantically related;
   automatically assigning preliminary semantic tags to each of the groups;
   providing a user interface that enables a user to validate the content of the groups to ensure that all sentences within a group have the same semantic meaning and to view and edit the preliminary semantic tags associated with the groups, wherein the interface includes:
      a groups view that displays a list of the groups and corresponding semantic tags for each group, wherein the groups view enables a user to edit the preliminary semantic tags associated with each of the groups,
      a sentence view that displays, for a selected group in the groups view, a list of unique sentences associated with the selected group, wherein in the sentence view a user is able to verify whether or not a sentence belongs to the group selected in the groups view, and
      a related-groups view that displays, for a selected group in the groups view or a selected sentence in the sentence view, a plurality of groups most closely-related to the selected group or sentence; and
   iteratively repeating the selecting, grouping, assigning, and providing steps with different subsets of user responses until all user responses have been processed, wherein each iteration uses data from previously validated and tagged groups to increase the accuracy of the clustering and assigning steps.

15. The non-transitory, computer-readable medium of claim 14, wherein the subsets are selected and processed such that the most common user responses are processed first.

16. The non-transitory, computer-readable medium of claim 14, wherein the subsets are selected and processed such that user responses with key words or phrases are processed first.

17. The non-transitory, computer-readable medium of claim 14, wherein the user responses are spoken utterances and, prior to the selecting step, transcriptions are obtained for the utterances.

18. The non-transitory, computer-readable medium of claim 14, wherein the user responses are written responses.

19. The non-transitory, computer-readable medium of claim 14, wherein the selecting, grouping, assigning, and providing steps are repeated in response to the user pressing a button to initiate semantic clustering for a next subset of responses.

20. A non-transitory, computer-readable medium comprising a computer program that, when executed by a computer system, enables the computer system to perform a method for enabling a developer of a steering application to associate semantic tags with user responses, the method comprising:
   obtaining user responses to an open-ended steering question;
   automatically grouping the user responses into groups, wherein each group is a set of sentences that are semantically related;
   automatically assigning preliminary semantic tags to each of the groups; and
   providing a user interface that enables a user to validate the content of the groups to ensure that all sentences within a group have the same semantic meaning and to view and edit the preliminary semantic tags associated with the groups, wherein the interface includes:
      a groups view that displays a list of the groups and corresponding semantic tags for each group, wherein the groups view enables a user to edit the preliminary semantic tags associated with each of the groups,
      a sentence view that displays, for a selected group in the groups view, a list of unique sentences associated with the selected group, wherein in the sentence view a user is able to verify whether or not a sentence belongs to the group selected in the groups view, and
      a related-groups view that displays, for a selected group in the groups view or a selected sentence in the sentence view, a plurality of groups most closely-related to the selected group or sentence.

\* \* \* \* \*